(12) United States Patent
Hung et al.

(10) Patent No.: US 6,515,663 B1
(45) Date of Patent: Feb. 4, 2003

(54) APPARATUS FOR AND METHOD OF PROCESSING THREE-DIMENSIONAL IMAGES

(75) Inventors: Hung-Chong Hung; Yu-Hsiang Huang, both of Taipei (TW)

(73) Assignee: Asustek Computer Inc., Taipei (TW)

( * ) Notice: Subject to any disclaimer, the term of this patent is extended or adjusted under 35 U.S.C. 154(b) by 0 days.

(21) Appl. No.: 09/418,179

(22) Filed: Oct. 13, 1999

(30) Foreign Application Priority Data

Mar. 19, 1999 (TW) ........................................ 88104308 A (51) Int. Cl.$^7$ .............................................. G06T 17/00
(52) U.S. Cl. ........................................ 345/427; 345/419
(58) Field of Search ................................. 345/418, 419, 345/420, 424, 426, 427, 428

(56) References Cited

U.S. PATENT DOCUMENTS

| | | | |
|---|---|---|---|
| 5,796,373 A | 8/1998 | Ming-Yen | |
| 5,808,588 A | 9/1998 | Lin | |
| 6,249,286 B1 | * 6/2001 | Dyer | 345/427 |
| 6,317,126 B1 | * 11/2001 | Tannenbaum | 345/426 |
| 6,323,862 B1 | * 11/2001 | Oxaal | 345/427 |
| 6,331,853 B1 | * 12/2001 | Miyashita | 345/427 |

* cited by examiner

Primary Examiner—Cliff N. Vo.
(74) Attorney, Agent, or Firm—Coudert Brothers LLP (57) ABSTRACT

The invention provides the apparatus for and method of processing three-dimensional images, efficiently and effectively rendering 3D images three-dimensional. The present invention's method of processing three-dimensional images avoids repetition of matrix calculation, and effectively sets the picture frame's Memory address. Hence, it is suitable for three-dimensional images with real-time image. Furthermore, the invention could further include a variation memory arrangement method and device, which could interlace in the Memory the scanning line of the first and second 3D images. It is then possible to display the first and second 3D image groups on the display screen in an interlaced manner according to the traditional scanning circuit and address-translating circuit. As a result, the left eye and the right eye can view the first and second 3D image groups separately.

6 Claims, 6 Drawing Sheets

APPARATUS FOR AND METHOD OF PROCESSING THREE-DIMENSIONAL IMAGES

BACKGROUND OF INVENTION

1. Field of Invention

The present invention relates to an apparatus for and method of controlling liquid-crystal-display (LCD) shutter glasses and, more particularly, to an apparatus and a method capable of alternately making the right and left LCD-type shutter of the LCD shutter glasses transparent. An observer who wears the said LCD shutter glasses controlled by the said apparatus to stare any planar picture will feel the three-dimension effect of said picture.

2. Description of Prior Art

With the arrival of the multimedia era and the advancement of technology, three dimensional image displaying systems has become an integral function of video game software, especially when building a three dimensional application software on a PC with the accompaniment of LCD Shutter Glass or Head Mounted Display. With the above setup, consumers can experience virtual reality. Using LCD Shutter Glass as an example, binocular disparity is commonly used to create depth perception and three-dimensionality such that an observer who wears the said LCD shutter glasses to watch any planar picture will feel the three-dimension effect of said picture.

Binocular disparity refers to the condition where when one stares at an object, there is a slight inconsistency between the images projected onto the left and right retinas due to different sight angles for the left eye and the right eye. After the optic nerves process. the slightly inconsistent images the viewer experiences the sensation of three-dimensional effect. In simpler terms, if a special method is used to form a first and second image from a purely two dimensional picture, and there exists between the first and second images a fixed discrepancy, and the left and right eyes are each limited to view only either the first or second image, then a three-dimensional effect can be achieved through binocular disparity. The function of the LCD Shutter Glass is as follows: when an image meant for left-eye-viewing is displayed, the LCD Shutter Glass's left lens transmits light while the right lens blocks light, and vice versa. Via the alternating light blocking and light transmitting functions of the lenses, the viewer experiences effect of three-dimensionality.

Figure 1:
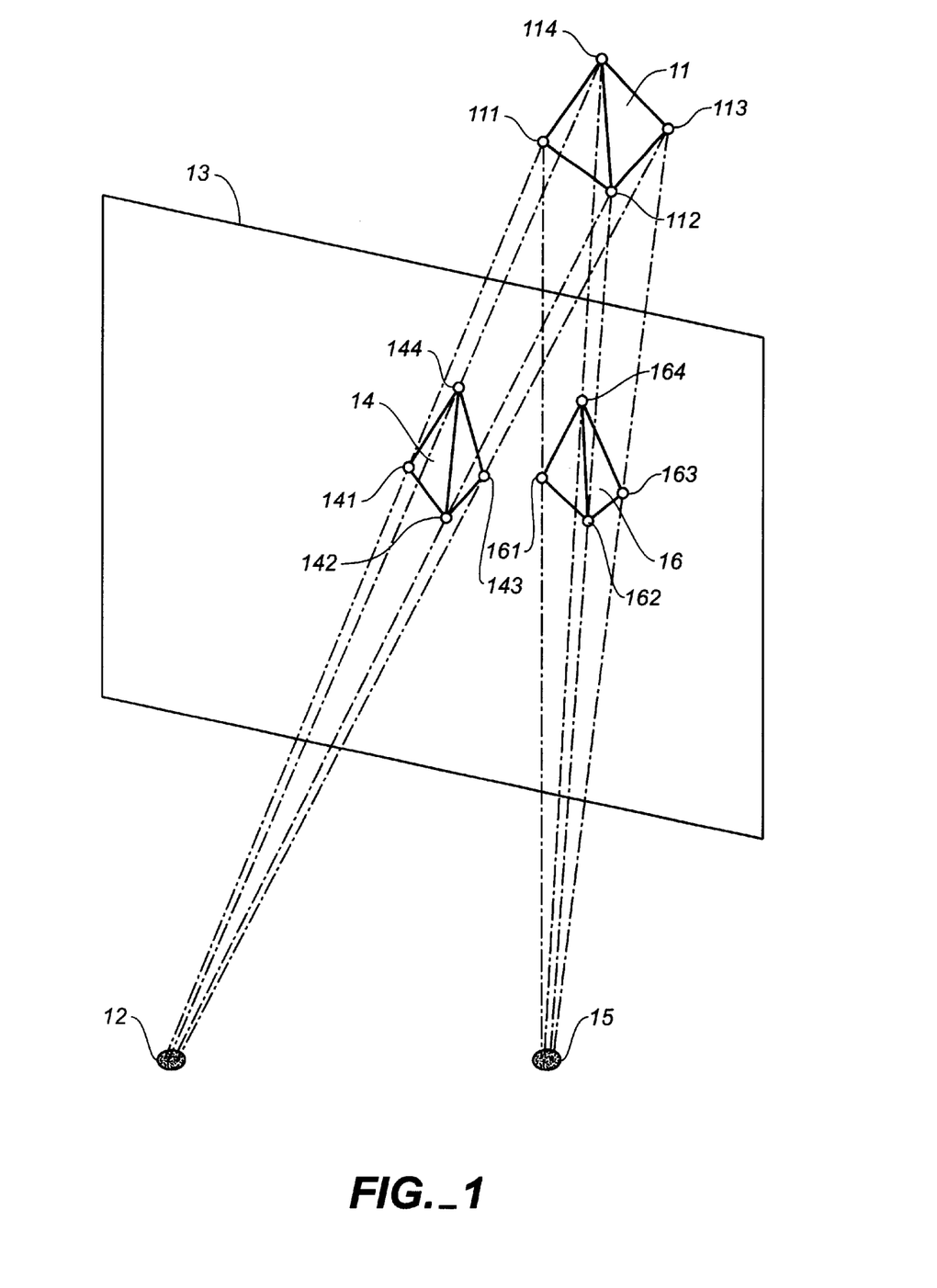
FIG. 1 indicates the method of formation of stereoscopic images.

Investigation shows that traditional 3D imaging systems (such as D3D, OpenGL,) mostly utilize the following principle (please refer to FIG. 1):

Hypothesize that an object 11 is placed in a virtual space, and the object's outline can be sketched by connecting a first apex 111, a second apex 112, a third apex 113, a fourth apex 114, and so on. In simpler terms, any object can be sketched by tracing the vectors of certain apexes. Therefore, if one wishes to display the object 11 on the screen 13, a first viewpoint 12 (for example the left eye of a person) could be of assistance, projecting the first apex 111 onto the computer screen 13, making it a first displaying point 141. The procedure is repeated for the second apex 112, the third apex 113, and the fourth apex 114, making them show up on the screen 13 as a second displaying point 142, a third displaying point 143, and a fourth displaying point 144, respectively. Then using a 3D Rendering Engine habitually employed by the industry, connect and outline the first displaying point 141, the second displaying point 142, the third displaying point 143, and the fourth displaying point 144. Subsequently, a first 3D image 14 is displayed on the computer screen. Only this kind of 3D image cannot create depth perception as binocular disparity can, and therefore is unable to supply the sensation of three-dimension one experiences in the real world. Hence, the invention refers to images made by a single viewpoint using linear perspective "3D images," not real "three-dimensional images."

The solution is to pair the first apex 111 with a second viewpoint 15 (such as a person's right eye), and project a fifth displaying point 161. Then, repeat the procedure with the second apex 112, the third apex 113, and the fourth apex 114 to project onto the screen 13 a sixth displaying point 162, a seventh displaying point 163, and a eighth displaying point 164. After processing by a 3D Rendering Engine a second 3D image 16 is displayed on the computer screen. There exists a certain discrepancy between the first 3D image 14 and the second 3D image 16, and the viewer's left eye is made to view only the first 3D image 14 while the right eye views only the second 3D image 16. As a result, the viewer experiences three-dimensionality due to binocular disparity.

Yet the above-described method of producing binocular disparity is limited in efficiency. Projecting the first apex 111 onto the computer screen to create the first displaying point 141 needs to be synchronized with matrix calculation. To convert the spatial coordinates of the first apex 111 into the computer coordinates of the first displaying point 141 requires a certain amount of time. Since binocular disparity is desired, it is necessary to once again employ matrix calculation to convert the first apex 111's spatial coordinates into the fifth displaying point 161. Clearly, the method described above requires many repetitions of the matrix calculation process before other procedures can be employed. Moreover, the matrix calculation process is very time-consuming, and naturally hinders the following imaging process. Therefore this repeated use of the matrix calculation process is mostly applied to "still three-dimensional" images; it fails to deliver ideal results when applied to "real-time image three-dimensional images" due to the extended processing time.

Figure 2A:
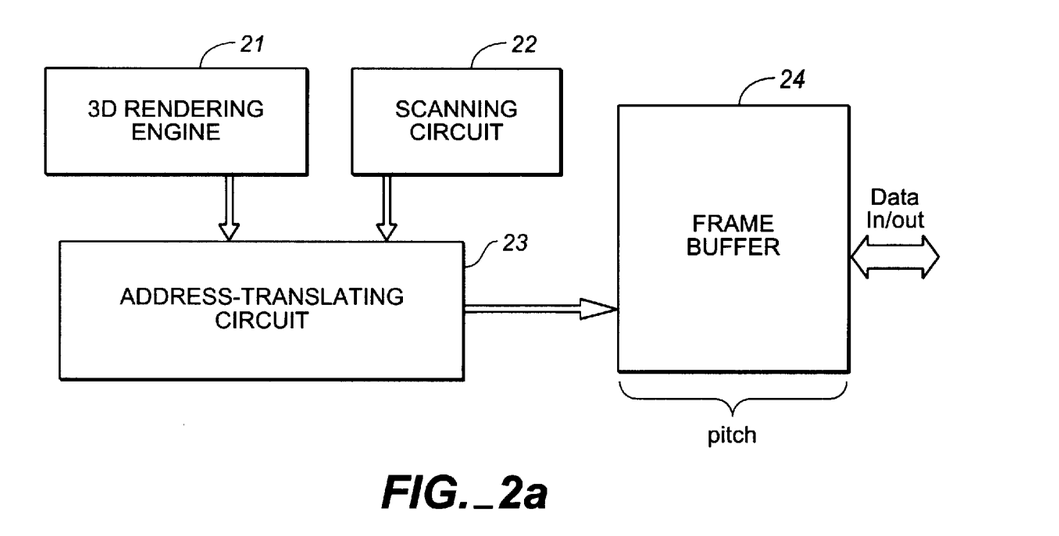
FIG. 2(a) is a block diagram showing the relationship between traditional 3D Rendering Engine 21, scanning circuit 22, address-translating circuit 23, frame buffer 24 and the screen 25.
Figure 2B:
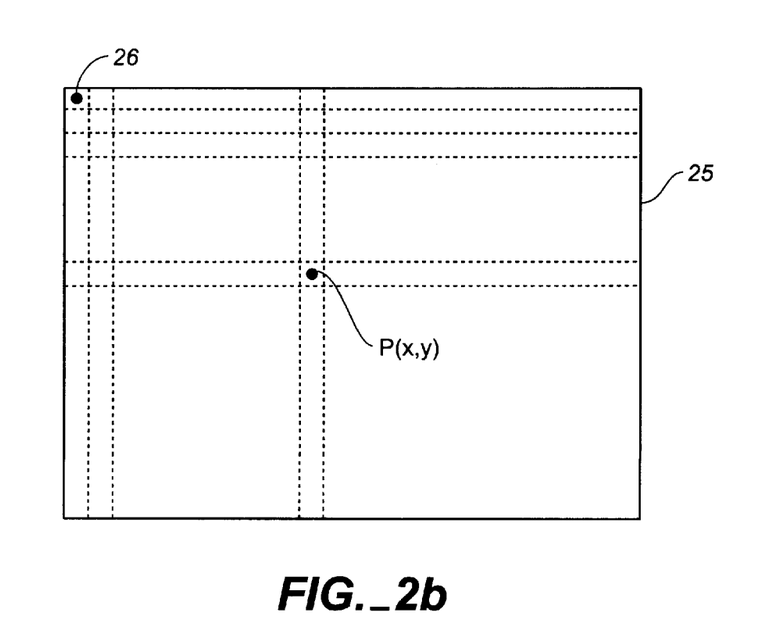
FIG. 2(b) indicates the real Memory address of any pixel P with the coordinates (x,y), when the origin is at the screen's upper left corner.
Figure 3:
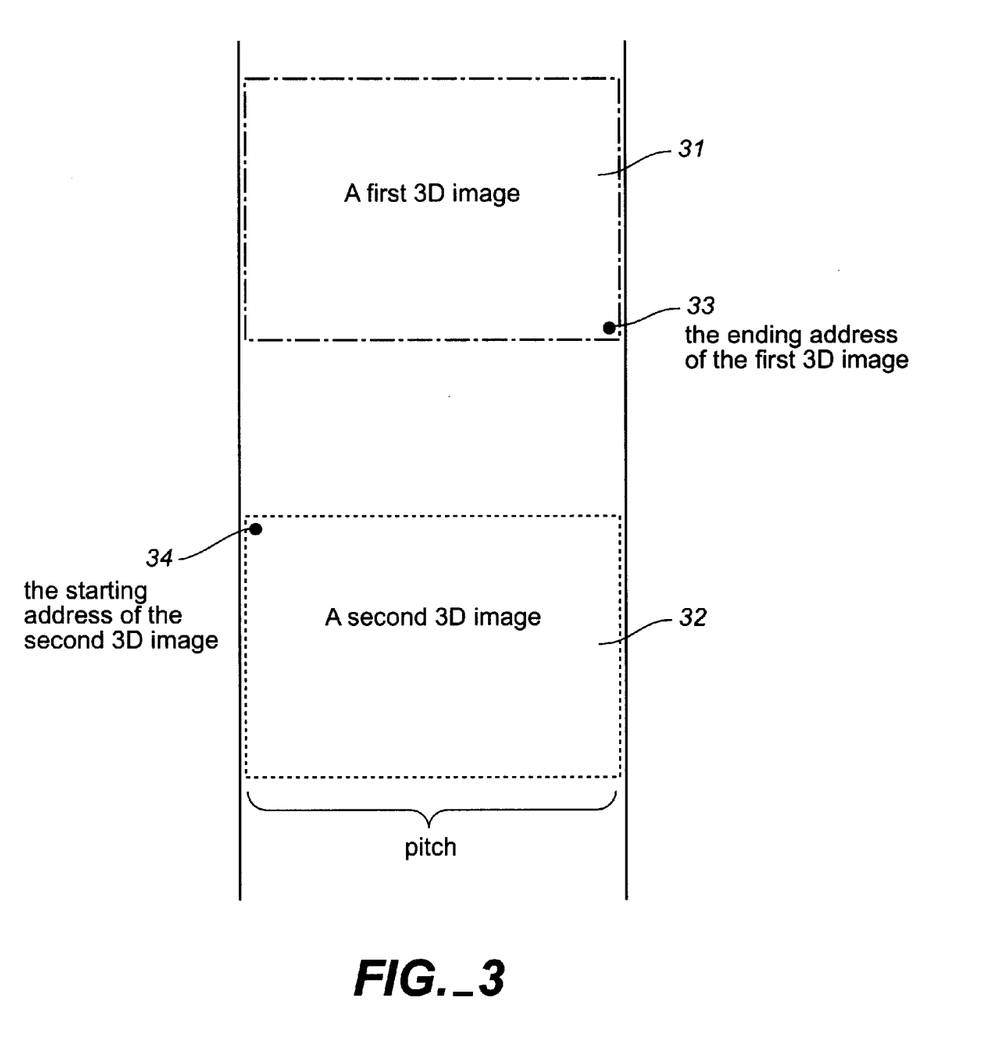
FIG. 3 shows the traditional memory placement relationship of the two 3D images created by the 3D Rendering Engine.

As the aforementioned, the 3D image obtained via processing by a traditional 3D Rendering Engine is still a two dimensional image. The 3D Rendering Engine saves the image's content in the frame buffer, and uses the scanning circuit to access the information in the frame buffer, and employs the interlace scan method to exhibit the 3D image information on the display screen—please refer to FIG. 2(*a*). FIG. 2(*a*) is a block diagram showing the relationship between a traditional 3D Rendering Engine 21, a scanning circuit 22, a address-translating circuit 23, and a frame buffer 24. A computer's Memory address is essentially an one dimension line vector, and the 3D image information in the frame buffer is composed of many pixel. For example, if the upper left comer of the screen 25 is an original point 26, the real Memory address of any pixel P with coordinates (x,y) should be (please refer to FIG. 2(*b*))

$$\text{Pixel P's real address} = P_0 + y*\text{pitch} + x$$

Where $P_0$ is the real Memory address of the original point 26 at the upper left corner of display screen 25; pitch is the width of every scanning line in the frame buffer 24 (please refer to FIG. 2(*a*)). The 3D Rendering Engine desires to sketch a 3D image (this image is still a two dimension image), so it requires the assistance of the said address-translating circuit 23 to convert every pixel in the 3D image's frame buffer before it's able to save information in the real Memory address. Similarly, when the scanning circuit 22 desires to display on the screen 25 every pixel information in the frame buffer based on an interlacing manner, the scanning circuit 22 also needs the address-translating circuit 23 to obtain the pixel's real address, then send the information saved in the real address to the screen 25. Traditionally, the display design of a regular stereoscopic system is divided into non-interlace and Interlace display scan. A three-dimensional visual display application of non-interlace display scan is more complicated in design because the left and right eyes must each be equipped with a display screen and shod. In concern with the mutual accommodation of the non-interlace processing systems and the ready-made three-dimensional images, it is seldom applied because the ready-made three-dimensional images usually designed for interlace processing system. Therefore, most stereoscopic displays utilize Interlace scan, placing two images with image discrepancy (the first 3D image 31 and the second 3D image 32) in separate memory addresses. Please refer to FIG. 3, which shows the memory placement relationship between two 3D images created in the traditional method by a 3D Rendering Engine. Yet the placement method of the two separate frame buffers in the memory inevitably causes problems for traditional scanning circuit 22. In order to display on the screen the aforementioned first 3D image 31 and second 3D image 32 in an interlacing manner, another kind of address-translating circuit, not the traditional address-translating circuit 23, is needed.

SUMMARY OF INVENTION

The invention targets the above problems, providing a three-dimensional image processing apparatus and method, effectively and efficiently render 3D images and then produce really three-dimensional effect. The invention's method of processing three-dimensional images avoids repetition of matrix calculation, and is effective in setting the picture frame's memory address. Hence, it is suitable for three-dimensional images with real-time image. Moreover, the three-dimensional image processing apparatus proposed by the invention doesn't need to alter the address-translating circuit 23; it only needs an additional and simple electric circuit. As a result, there will be a lowering of manufacturing costs. To further illustrate the invention's method, structure, and characteristics, we herein elucidate the more successful incidences of the invention with the accompaniment of diagrams. However, the following elucidation is of a "better case scenario," and of course cannot be used to limit the range of the invention's actual application. Therefore, any equal or similar variation on the spirit of the invention set forth in the patent application should fall within the scope of the invention's patent application.

DETAILED DESCRIPTION OF THE INVENTION

Figure 4:
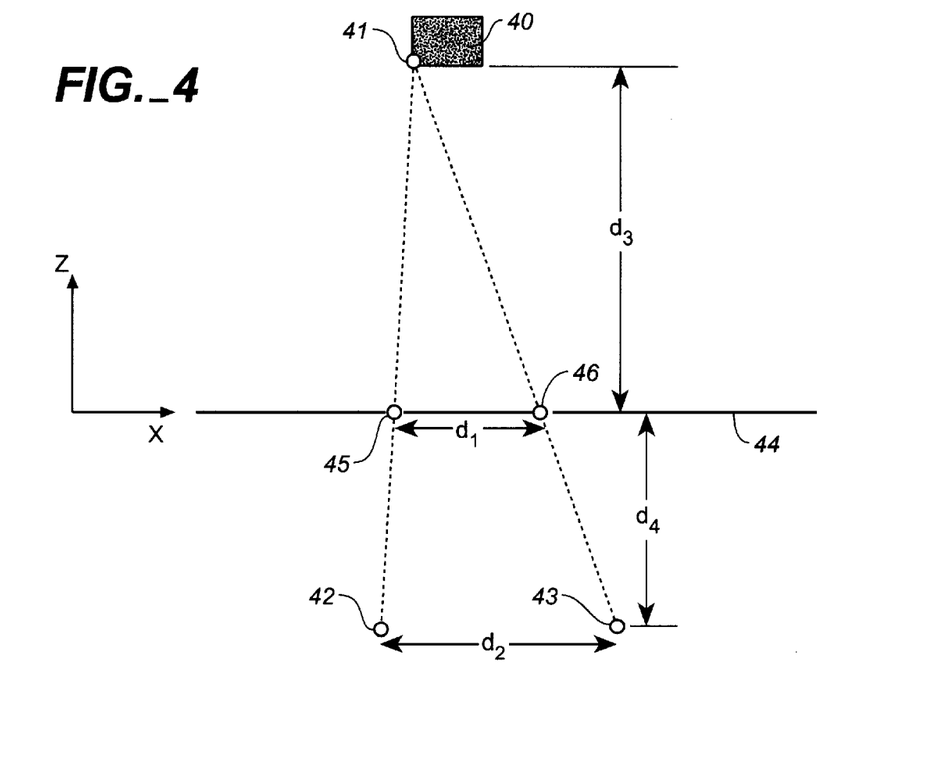
FIG. 4 indicates the invention's formation of stereoscopic image method.

To generate real three-dimensional images, it is best to use binocular disparity, letting there be a slight discrepancy between the images viewed by the right eye and the images viewed by the left eye, thus creating a sense of three-dimension. Please refer to FIG. 4, which indicates the invention's formation of stereoscopic image method, and assume that the displacement of address of the left and right eye is in the horizontal direction. Because the left eye and right eye are addressed on the same plane, and only have displacement in the horizontal direction, it is clearly that the main difference between the images viewed by the left and right eye is merely in the horizontal displacement, and the value of displacement between two images seen by left and right eyes is related to the related position of objects and observers. Assume that an apex 41 of object 40 is situated in upper X-Z plane (please refer to FIG. 4); let the left eye 42 and the right eye 43 each be a viewpoint for projecting images on screen 44, generating the first displaying point 45 and the second displaying point 46. Since the left and right eyes are addressed on the same plane and only have displacement in the direction of X, the coordinate value of the first displaying point 45 and the second displaying point 46 vary only in the displacement in the direction of X. The distance from the left eye to the right eye $d_2$, the distance from the apex 41 to the screen 44 $d_3$, and the distance from the left and right eyes to the screen 44 $d_4$ all have vital relationships with the displacement $d_1$. It may be concluded by employing simple geometry principles (comparable to that of the triangle,) that the displacement $d_1$ between the first displaying point 45 and the second displaying point 46 could be expressed as:

$$d_1 = d_3 * d_2 / (d_4 + d_3)$$

Hence, after the first displaying point 45 engages in matrix calculation via the aforementioned image projection method and obtains its coordinate address on the screen 44, it would be very time-consuming for the second displaying point 46 to engage in matrix calculation using the traditional image projection method. In reverse, the present invention provides apparatus for and method of processing three-dimensional images. After applying matrix calculation the coordinates of the first displaying point 45 are known to be (x,y,z); to obtain the coordinates of the second displaying point 46 one only needs to subtract d, from the x coordinate of the first displaying point 45, getting $(x-d_1,y,z)$. This method saves time by eliminating the matrix calculation process.

Currently most 3D images use 3D Rendering Engines to draft 3D pictures. Once all other apexes of object 40 projected onto the screen 44 using the previously described method, the next step would be to let a 3D Rendering Engine process every displaying point viewed by the left eye 42, thus creating a 3D image available for left eye 42 viewing. By the same principle, letting a 3D Rendering Engine render every displaying point viewed by the right eye 43, thus drafting on the screen another 3D image meant for right eye 43 viewing, and as a result create an image with real three-dimensional effects.

The invention's three-dimension image processing method include the following steps:

1) projecting step: using matrix calculation to compute the displaying point, whose coordinate is on the screen and projected by every apex of each object existing in virtual space, and assume those displaying points are the first point-coordinate group of the 3D image meant for left eye viewing;

2) shifting step:
   i) in accordance with the apex of every object, obtain the distance between each apex and the screen;
   ii) using the aforementioned distance from each apex to the screen, the distance between the eyes, and the distance from the human eye to the screen, compute the amount of horizontal movement necessary for each displaying point in a first point-coordinate group of the 3D image meant for left eye viewing. This leads to the creation of a second point-coordinate group shown on the screen. The 3D image formed by the second point-coordinate group is available for right eye viewing;

3) image generating: after the 3D Rendering Engine processes the first point-coordinate group, a first 3D image group meant for left eye viewing is generated in the Memory. Then, the 3D Rendering Engine processes the second point-coordinate group to generate a second 3D image group meant for right eye viewing;

4) three-dimensional image displaying: export in an interlacing manner the first 3D image group and the second 3D image group, letting the left eye and right eye view the images separately.

Comparing to the prior art of the Republic of China's Patent Number 084753 "Three-Dimensional Imaging System and Method of Using Depth of Vision to Show Two Dimension Images," the aforementioned method includes:

1) using the 3D Rendering Engine to form a first image group
2) replicating the said first image group to form a temporary image group;
3) shift the said temporary image group a predetermined distance to form a second image group;
4) combining the said first and second images group;
5) showing the combined images to form three-dimensional images.

However, the procedures contain the following flaws: 1) to create the temporary image group one needs to completely replicate all the pixels in the first image group, not the first point-coordinate group in the present invention. The Memory and time required by this replication is related to the computer screen's resolution; the higher the resolution, the larger the Memory required, and the longer the time is needed for replication. 2) When computing displacement of vision disparity, one needs to calculate and move all the pixels in the temporary image group in order to generate the second image group, but not the first point-coordinate group in the present invention. The larger the image, the more pixels are involved, extending the length of time needed for displacement of vision disparity.

By contrast, one only applies the present invention to generate the second point-coordinate group by shifting the first point-coordinate group, then let the 3D Rendering Engine handle the rest to output the first 3D image group and the second 3D image group. This eliminates the need to engage in 3D image replication and numerous calculation, saves computing time, and is therefore suitable for three-dimensional real-time image usage.

Figure 5:
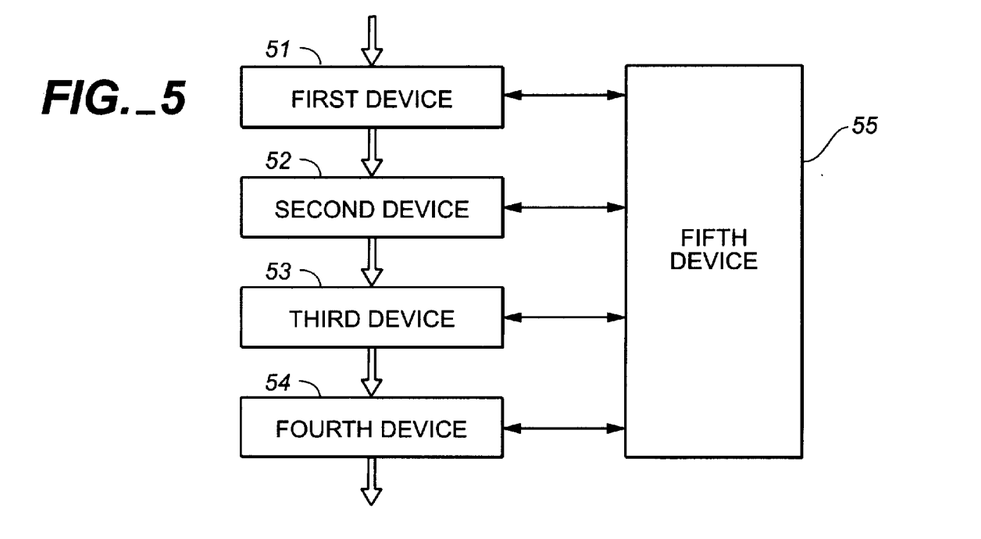
FIG. 5 is a block diagram of the present invention's apparatus for processing three-dimensional image.

Moreover, to speed up the display of three-dimensional images, the invention provides a three-dimensional image generation apparatus, please refer to FIG. 5, which is a block diagram of the present invention of three-dimensional image generation apparatus. The three-dimensional image generation apparatus 50 includes a first device, a second device, a third device, and a fourth device. The first device 51 is responsive to a plurality of apex coordinates respectively corresponding to the multiple objects existing in virtual space, for generating a first point-coordinate group with respect to a display device. Said first point-coordinate group includes a plurality of display points. The second device 52 is used for computing amount of horizontal movement required for each display point of said first point-coordinate group, and generating a second point-coordinate group with respect to the display device. The third device 53 is responsive to said first point-coordinate group and said second point-coordinate group, for generating a first 3D image group and a second 3D image group. The fourth device 54 is used for, interlaced, displaying said first and said second 3D image groups on the display device. The said three-dimensional image generation apparatus 50 could further comprise a fifth means 55 used for memorizing the data of the first point-coordinate group, the second point-coordinate group, the first 3D image group, and the second 3D image group.

Figure 6A:
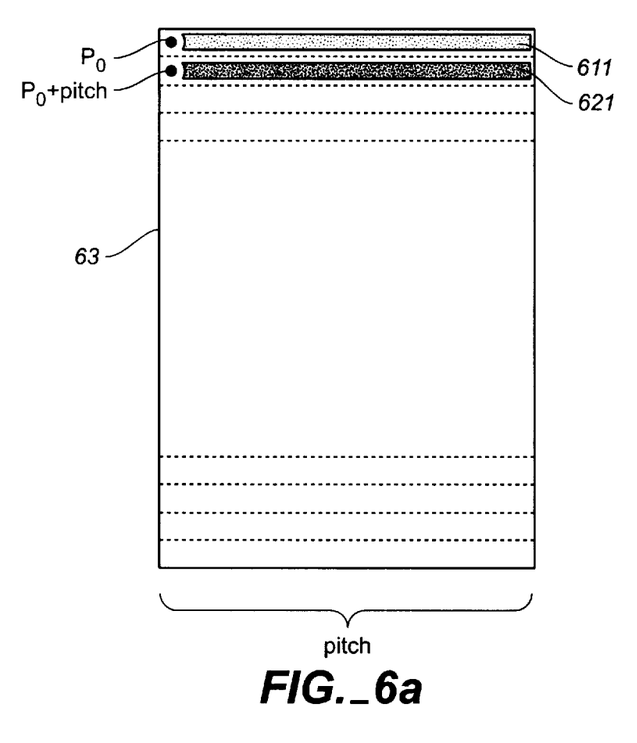
FIG. 6(a) indicates, in the present invention, every scanning line of the first 3D image 61 and the second 3D image 62 saved interlaced in the Memory.

In order to comply with the traditional scanning circuit 22 and address-translating circuit 23, the said three-dimensional image generating method of the present invention could further include a variation memory arrangement procedure. The said procedure interlacedly arranges the scanning line of the first 3D image group and the scanning line of the second 3D image group in the Memory. Please refer to FIG. 6, FIG. 6(a) indicates, in the present invention, the scanning line of the first 3D image group and the scanning line of the second 3D image group are placed interlacedly in the Memory. In the beginning, a first scanning line 611 of the first 3D image group 61 is saved in the Memory. Afterward, a first scanning line 621 of the second 3D image group 62 is saved, then in sequence every scanning line of the first 3D image 61 and second 3D image 62 is saved, interlaced, in the Memory, becoming a combined frame buffer 63, as shown in FIG. 6(a). Hence, the corresponding real Memory address of a pixel $P_1$, found in the first 3D image group 61, with coordinates of $(x_1,y_1)$ would be (please refer to FIG. 6(b))

Figure 6B:
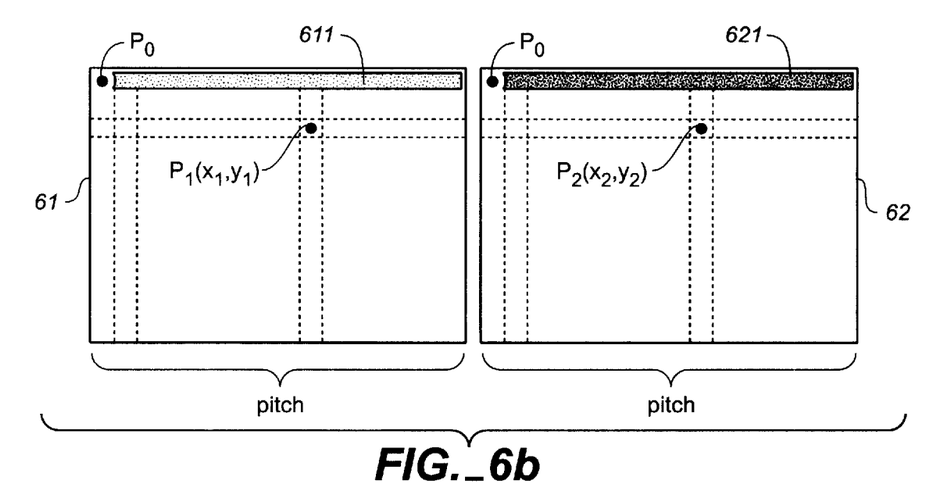
FIG. 6(b) indicates the corresponding real memory address of a pixel $P_1$ with coordinates $(x_1,y_1)$ existing in the frame buffer of the first 3D image 61 and; the corresponding real Memory address of a pixel $P_2$ with coordinates $(x_2,y_2)$ existing in the frame buffer of the first 3D image 61.

Address of pixel $P_1=(P_0+\text{pitch})+y_1*(2*\text{pitch})+x_1$

And the corresponding real Memory address of a pixel $P_2$, found in the second 3D image 62, with coordinates of $(x_2,y_2)$ would be Address of pixel $P_2=(P_0+\text{pitch})+y_2*(2*\text{pitch})+x_2$ Meaning, when the 3D Rendering Engine wishes to store the first 3D image group 61's data in the Memory, it only needs to set the starting address as $P_0$, and the width of the frame buffer's scanning line as 2*pitch; and when drafting the second 3D image in the Memory, just change the starting address to ($P_0$+pitch), leaving the width of the frame buffer as 2*pitch, then every scanning line of the first 3D image 61 and the second 3D image 62 can be saved, interlaced, in the Memory, and become the combined frame buffer 63, as shown in FIG. 6(*a*). Hence, the traditional scanning circuit 22 and address-translating circuit 23 can still maintain the Interlace scan method of old, displaying the odd-numbered scanning lines of the combined frame buffer 63, which happen to be the frame buffer data of the first 3D image group 61. When displaying the even-numbered scanning lines of the combined frame buffer 63, it also happens to be the frame buffer data of the second 3D image group 62. Such interlaced display provides separate images for left and right eye viewing, then the traditional scanning circuit 22 and address-translating circuit 23 have not to change or alter the circuits but still can work normally.

Figure 7:
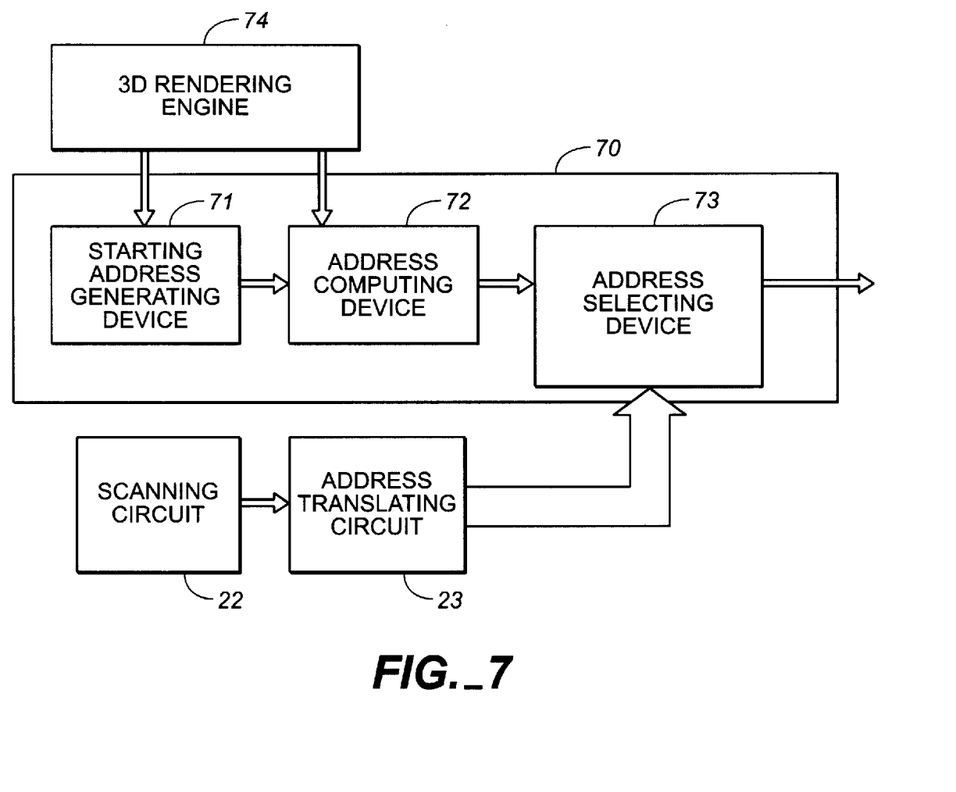
FIG. 7 indicates the block diagram of the present invention's variation memory arrangement device.

In order to comply with the traditional scanning circuit 22 and address-translating circuit 23, the said three-dimensional image generation apparatus 50 further comprises a sixth device for processing the variation memory arrangement. Please refer to FIG. 7, the sixth device 70 includes: a starting address generating device, an address computing device and an address selecting device. The said starting address generating device 71 selectively exports a predetermined address of different origins. When the 3D Rendering Engine 74 drafts the first 3D image group 61, the starting address generating means 71 sends out $P_0$ as the starting address of the origin. On the other hand, when 3D Rendering Engine 74 drafts the second 3D image group 62, the starting address generating device 71 sends out ($P_0$+pitch) as the starting address of the origin. The said address computing device 72 is responsive to a pixel coordinate in said first 3D image group 61 or said second 3D image group 62 and the output value of the starting address generating device 61, then generating a real memory address of said pixel coordinate. The said address selecting device 73 is used to selectively export the output address of the address computing means 72 if 3D Rendering Engine 74 is in operation in order to store 3D images in the memory, or the output address of address-translating circuit 23 if scanning circuit 22 is in operation in order to show 3D images on the screen.

In conclusion, the invention's three-dimensional image generating method can efficiently and effectively render 3D images three-dimensional. The present invention's method of processing three-dimensional images avoids repetition of matrix calculation, and is effective in setting the picture frame's Memory address. Hence, it is suitable for three-dimensional images with real-time image. Moreover, the three-dimensional image processing apparatus proposed by the invention doesn't need to alter the traditional scanning circuit 22 and address-translating circuit 23; it only needs the addition of simple electric component sets to manifest three-dimensional images, thus lowering manufacturing costs.

While the invention has been described in connection with what is presently considered to be the most practical and preferred embodiments, it is to be understood that the invention is not to be limited to the discovered embodiments. The invention is intended to cover various modifications and equivalent arrangement included within the spirit and scope of the appended claims.

What is claimed is:

1. A three-dimensional image generating apparatus, the apparatus being responsive to a 3D image for creating three-dimensional effect based on said 3D image, said 3D image including multiple objects, said generating apparatus comprising:

a first means, responsive to a plurality of apex coordinates respectively corresponding to the multiple objects, for generating a first point-coordinate group with respect to a display device, said first point-coordinate group including a plurality of displaying points;

a second means, for computing amount of horizontal movement required for each displaying point of said first point-coordinate group, and generating a second point-coordinate group with respect to the display device;

a third means, responsive to said first point-coordinate group and said second point-coordinate group, for generating a first 3D image group and a second 3D image group and;

a fourth means, for interlacely displaying said first and said second 3D image groups on the display device.

2. The apparatus as. recited in claim 1, further including a fifth means, for memorizing said first point-coordinate group, said second point-coordinate group, said first 3D image group, and said second 3D image group.

3. The apparatus as recited in claim 2, further including a sixth means, for interlacing scan lines of said first 3D image group and said second 3D image group in said fifth means.

4. The apparatus as recited in claim 3, wherein said sixth means comprises:

a starting address generating means, for selectively exporting a predetermined address of different origins;

an address computing means, responsive to a pixel coordinate in said first 3D image group or said second 3D image group and the output value of the starting address generating means, for generating a real memory address of said pixel coordinate;

an address selecting means, for selectively exporting a corresponding address needed by a 3D rendering engine or a scanning circuit.

5. A method for generating three-dimensional image, the method being responsive to a 3D image, for generating three-dimensional effect based on said 3D image, said 3D image including multiple objects said generating method comprising steps of:

1) a projecting procedure, the projecting procedure generating a first point-coordinate group by projecting onto a display device a plurality of apex coordinates respectively corresponding to the multiple object;

2) a shift computing procedure, the procedure computing amount of horizontal movement required for each display point of said first point-coordinate group, and generating a second point-coordinate group with respect to the display device;

3) an image generating procedure, the procedure generating a first 3D image group and a second 3D image group via data of said first,point coordinate group and said second point coordinate group;

4) a display procedure, the display procedure displaying said first 3D image group and said second 3D image group on said display device in an interlaced manner.

6. The method as recited in claim 5, further comprising a variation memory arrangement procedure for placing scan lines of said first and said second 3D image groups in an interlaced manner in a memory device.

* * * * *